United States Patent
Ishii et al.

[15] 3,673,659
[45] July 4, 1972

[54] METHOD FOR BONDING VANES IN TORQUE CONVERTER

[72] Inventors: Hirozi Ishii; Koichi Okamoto, both of Fuji, Japan

[73] Assignee: Nissan Motor Company, Limited, Yokohama, Japan

[22] Filed: Nov. 6, 1969

[21] Appl. No.: 874,477

[30] Foreign Application Priority Data

Nov. 16, 1968 Japan...................................43/83530

[52] U.S. Cl..............................29/156.8 CF, 29/156.8 FC
[51] Int. Cl..................B21k 3/04, B23p 15/02, B23p 15/04
[58] Field of Search............29/156.8 R, 156.8 FC, 156.8 CF, 29/156.8 H

[56] References Cited

UNITED STATES PATENTS

| | | | |
|---|---|---|---|
| 2,556,676 | 6/1951 | Carnegie | 29/156.8 H |
| 2,806,361 | 9/1957 | Kline | 29/156.8 CF |
| 2,899,129 | 8/1959 | Schwaiger | 29/156.8 CF |
| 3,211,364 | 10/1965 | Wentling | 29/156.8 CF |
| 3,228,344 | 1/1966 | Cooper | 29/156.8 CF |
| 3,423,012 | 1/1969 | Baker | 29/156.8 CF |

*Primary Examiner*—John F. Campbell
*Assistant Examiner*—Donald P. Rooney
*Attorney*—John Lezdey

[57] ABSTRACT

A method for bonding vanes to the impeller or turbine of a torque converter wherein the vanes are pressed to have their inner and outer flanges extending in the same direction and its blade web warped or curved in cross section, spot-welded to the core structure, snapped into the shell structure complete with the core structure, and then heated together with flux material to have the joint connections welded together at a temperature higher than the melting point of the flux material.

2 Claims, 7 Drawing Figures

PATENTED JUL 4 1972 3,673,659

Hirozi Isqii and Koichi Okamoto INVENTOR

BY

John Lezdey ATTORNEY

Hirozi Ishii and Koichi Okamoto INVENTOR

BY

John Lezdey ATTORNEY

METHOD FOR BONDING VANES IN TORQUE CONVERTER

This invention is generally concerned with a torque converter of an automotive transmission system and, more particularly, with method of bonding vanes to the impeller or turbine of the torque converter.

In the following description of the invention, the impeller or turbine of a torque converter is referred to as "base member" to which the vanes are to be bonded or welded.

It is presently the ordinary practice in mounting the vanes to the base member of a torque converter to score slits in the core and shell structures of the base member to secure the vanes in position therethrough. In this instance, each vane is bonded to the base member by means of a pawl formed at the peripheral edge of the vane. The pawl of the vane is inserted into the slit in the base member and bent against the surface of the base member. Forming slits in the base member and pawls in the vanes, however, involves increased production cost and prolonged time period required to build a pilot product in the course of research and development of new torque converters. In the production on a commercial basis, moreover, it is necessary to use an expensive die for forming the slits in the base member and the die is quite liable to wear in a short period of time. This is reflected by an increased production cost of final products. The vanes being bonded to the base member simply by the vent pawls, furthermore, the connection between the vanes and base member is apt to loosen after a prolonged use of the torque converter. This invites an improper performance of the torque converter when fitted to the transmission of a motor vehicle.

Attempts have therefore been made to eliminate these difficulties of the conventional method of manufacturing a torque converter and the foremost of such attempts is the method in which the vanes are bonded to the base member by brazing with electrolytic copper in an electric furnace. In this known method, an alloyed layer is formed between the vanes and the base member to which the vanes are connected. The alloyed layer serves to strengthen the mechanical connection between the vanes and base member to assure stabilized performance of the torque converter thus built. Since the slit-machining is unnecessary in this method, the problems encountered in the standard method such as the high production cost can be solved to a certain extent.

Difficulties are, however, still experienced in this improved method of bonding the vanes to the base member of a torque converter. One of such difficulties is that, since the flanges of the vane to be welded to the core and shell structures are bent in opposite directions, the pressing process requires extremely advanced techniques. Another typical drawback is the necessity of using a jig for welding the vanes to the shell structure of the base member. Before the assembly of the base member and vanes is placed in a furnace, the vanes are bonded to the core structure by means of spot-welding and to the shell structure with use of a specially designed jig. This will result in a reduced thermal capacity of the furnace and, since the jig becomes deformed after it has been used two or three times and thus must be discarded as useless, unduly high production cost is still necessitated as the result of using a number of such jigs. In welding the vanes to the base member, moreover, a specially prepared brazing material is used which is a paste-like mixture of pulverized copper and alcohol. The use of such brazing material is not desirable not only because of its high cost but because of the otherwise unnecessary step of applying the brazing material to the flanges of each vane. The use of a costly cracked-gas of ammonium as an atmospheric agent in the furnace is also the cause of the increased production cost of the torque converters fabricated by this improved method. A still further drawback of this prior art method is that the vane differs in thickness from the shell and core structures (for instance, the vane is typically 0.6mm thick and the core and shell structure are 1.0 to 1.2mm thick) and that the vane tends to contract much more than the core and shell structures do. Thus the core and shell structures are subjected to the pull from the flanges of the vane and, in consequence, are liable to deformation.

This invention is, therefore, intended to overcome all these drawbacks inherent in the conventional methods of bonding the vanes to the base member of a torque converter and it is an important object of the invention to provide an improved method of bonding the vanes to the base member (which actually is the impeller or turbine) of a torque converter with a significantly reduced production cost.

Another important object of this invention is to provide a simplified method of welding the vanes to the base member of a torque converter with sufficient construction accuracy to assure stabilized performance of the torque converter as it is installed on the transmission system of a motor vehicle.

Still another important object of this invention is to provide an advanced method of welding the vanes to the base member of a torque converter whereby neither the vanes nor the core and shell structures of the base member are kept free from deformation over an extended use of the torque converter.

In order to achieve these objects, the invention proposes to use a vane which is pressed to have its flanges extending in the same direction and its blade web warped to be curved in section. The vanes are then connected, only temporarily, to the core structure of the base member by, for instance, spot-welding. The core structure with the vanes thus connected thereto is fitted to the shell structure in a manner to have the vanes subjected to a prestress due to the spring action resulting from the curvature in the cross section of the vane. Brazing materials (which may be copper, for instance) each shaped in a ring are interposed between the vane and the core and shell structures. The assembly of the base members and vanes is placed in a suitable atmosphere and is heated to a temperature higher than the temperature at which the brazing material is melted. In this manner, the vanes are brazed to the core and shell structures of the base members.

The objects and features of the method according to this invention will be more clearly understood from the following description of the invention taken in conjunction with the accompanying drawings, wherein:

FIG. 2b is a section on line I—I of FIG. 2a;

FIG. 3b is a section on line II—II of FIG. 3a;

It should be understood before entering into the detailed discussion that, although the method according to this invention is herein described as applied to a torque converter of an automotive transmission system, the same is applicable to any vaned element including a fluid coupling.

A torque converter for an automotive transmission system comprises as its essential components an impeller acting as the driving member, a turbine acting as the driven member and a stator acting as a reaction element. The assembly of the impeller and turbine resembles a hollowed-out doughnut sliced in half, with vanes, or blades, set radially into the halves. Each of the impeller and turbine is constructed by a core structure forming the inner wall and a shell structure forming the outer wall. The vanes are tightly secured to both the outer surface of the core structure and the inner surface of the shell structure.

Figure 1:
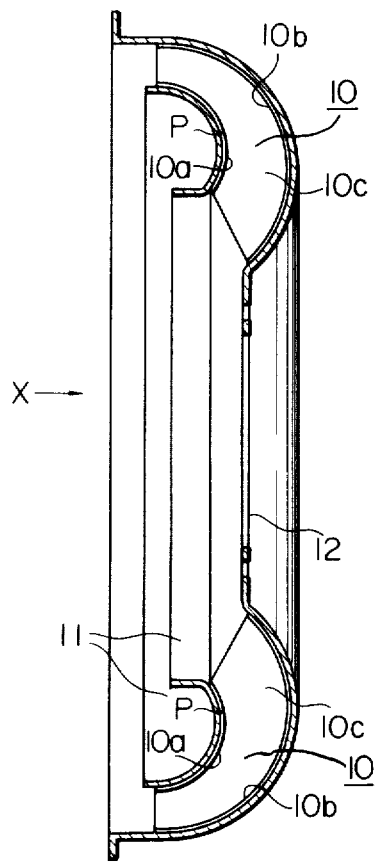
FIG. 1 is a cross-sectional view of an assembly of the vanes and the impeller or turbine (base member) of a torque converter.

The relative positions of these elementary members are illustrated in FIG. 1. As shown, the vane 10 is connected by its inner curved flange 10a to the correspondingly curved outer wall of the core 11 and by its outer curved flange 10b to the also correspondingly curved inner wall of the shell structure 12. The core and shell structures 11 and 12, respectively, to be used for building the torque converter in the method according to this invention may be those which are shaped as customary.

Figure 2A:
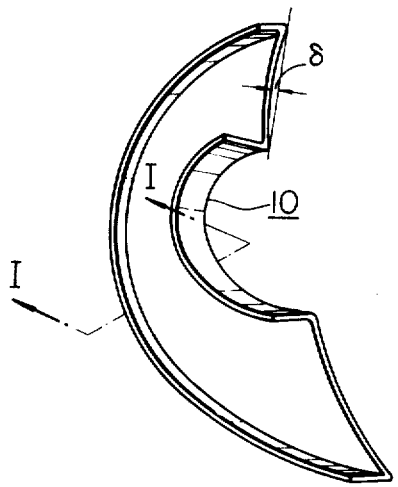
FIG. 2a is a perspective view of one of the vanes seen in FIG. 1.
Figure 2B:
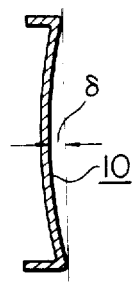

According to the invention, however, the vanes 10 are pressed in such a manner that each of the vanes has its inner and outer flanges 10a and 10b, respectively, directed in the same direction and a blade web 10c is slightly curved in cross section with a curvature of δ, as clearly seen in FIGS. 2a and 2b.

The inner flange 10a of the vane 10 is welded at a suitable spot "P" to the core structure 11 by, for instance, spot-welding. The core structure 11 with the vanes 10 bonded thereto is then snapped into the direction of "X" into the shell structure 12. In this instance, vanes 10 can be positioned securely in the shell structure 12 without being welded to the inner wall of the structure 12, because the vane 10 curved in cross section acts as a spring to force the outer flange 10b thereof against the wall of the shell structure 12. In this instance, the inside diameter of the peripheral edge of the shell structure 12 at which the outer flange 10b is admitted into the shell structure is slightly larger than the overall diameter of the assembly of the core structure 11 and vanes 10. Thus, as the outer flange 10b of each vane 10 is forced into the shell structure 12 through the slightly enlarged peripheral edge of the shell structure 12, a frictional force is exercised between the inner surface of the shell structure 12 and outer edge of each vane 10.

Figure 3A:
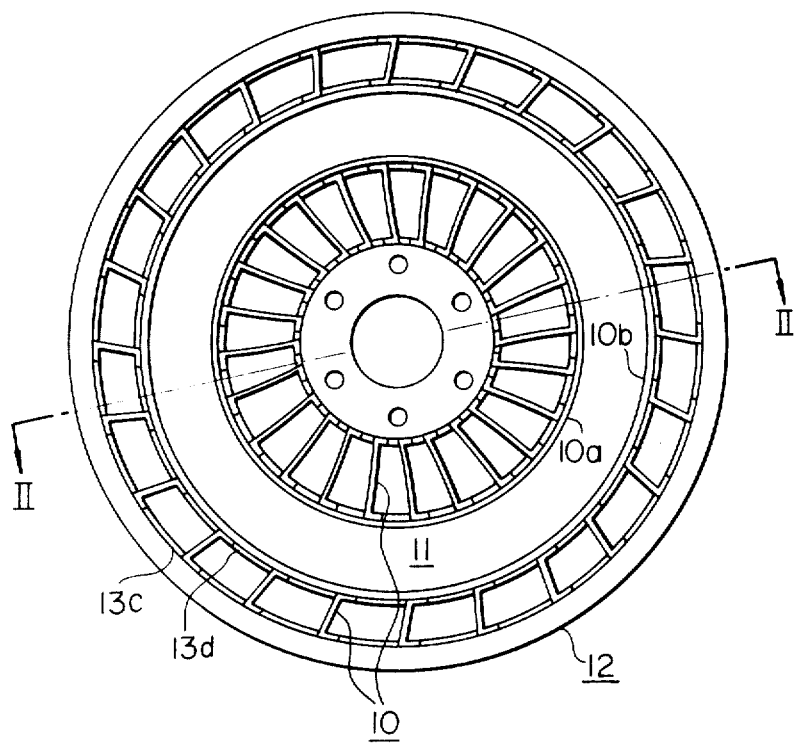
FIG. 3a is a plan view of an assembly of the vanes and core and shell structures being welded together.
Figure 3B:
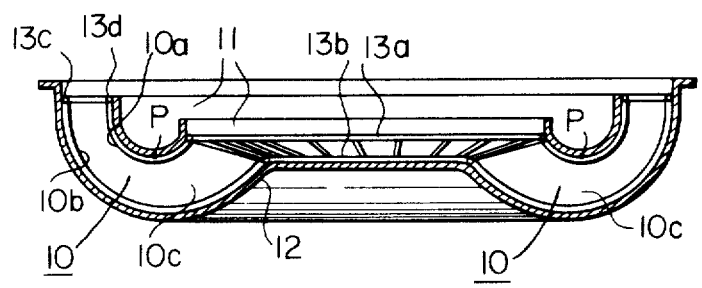

Two differently sized copper rings 13a and 13b are inserted between the flange 10a and core structure 11 and between the flange 10b and shell structure 12, respectively, and also differently sized copper rings 13c and 13d inserted between the flange 10b and shell structure 12 and between the flange 10a and core structure 11. The assembly thus arranged is illustrated in FIGS. 3a and 3b.

Now, the assembly is placed in an electric furnace which is constructed in a manner later to be described and shown, The furnace is filled with suitable reducing atmosphere and is internally maintained at the temperature ranging from 1,110° to 1,130° C, to heat the assembly to a temperature higher than the melting point of the copper rings 13a to 13d. The assembly is removed out of the furnace upon completion of the welding.

It should be noted in this instance that, while the assembly is being heated in the furnace, the local deformation occurring in the core and shell structures 11 and 12 resulting from the difference in the contraction coefficient is nullified with the change in the curvature in cross section of the vane 10.

It should be also noted that the brazing material for use in the welding of the assembly is herein exemplified in a copper ring, other less costly materials may be utilized to reduce this production cost.

The practical advantage of the method thus arranged will be more clearly ascertained from the following example of the experiment conducted by the inventors.

EXAMPLE

A plurality of vanes 10 which were 0.4 to 0.8mm thick were pressed in such a manner that each of the vanes had inner and outer flanges 10a and 10b, respectively, extending in the same direction and was curved in cross section with a curvature of δ = 0.5 to 1mm. The inner flange 10a was 4 to 5mm wide and the outer flange 10b was 7 to 8mm wide.

The vanes 10 so sized and shaped were bonded to the core structure 11 by spot-welding and the resultant assembly of the vanes and core structure was forced into the shell structure 12 so that the vanes 10 were securely positioned in the structure 12.

Two copper rings 13a and 13b were interposed between the flanges 10a and core structure 11 and between the flanges 10b and shell structure 12 and another set of copper rings 13c and 13d were inserted between the flange 10b and shell structure 12 and between the flange 10a and core structure 11. The assembly of the vanes and core and shell structures was then passed into the furnace at a conveying speed of 15 to 20cm/min. The furnace was filled with a heat-generating fuel gas and was maintained at a temperature of 1,110° to 1,130° C. The assembly was thus kept heated at a temperature higher than the melting point of the copper rings for about one 10 minutes.

It was found in this experiment that the melted copper brazing material was so fluid on the non-oxidized surface of the base member as to flow into narrow gaps satisfactorily due to the capillary action. The copper material flowed into the gaps and formed alloyed layers therein to provide strong connections between the vanes and base members.

Figure 4:
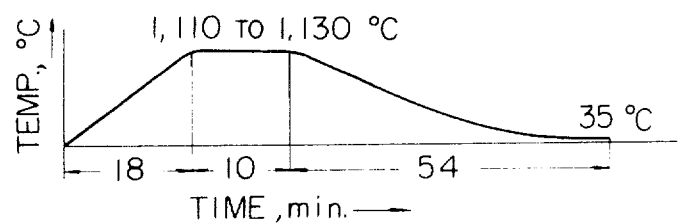
FIG. 4 is a graphical representation of the typical example of a temperature variation against the time in minutes while in the heating process of the assembly shown in FIGS. 3a and 3b.

The temperature in the furnace was varied in a manner plotted in FIG. 4. As observed, the assembly was preliminarily heated for 18 minutes until a desired temperature was reached. This desired temperature was maintained for 10 minutes and thereafter the assembly thus heated was slowly cooled down for 54 minutes.

Figure 5:
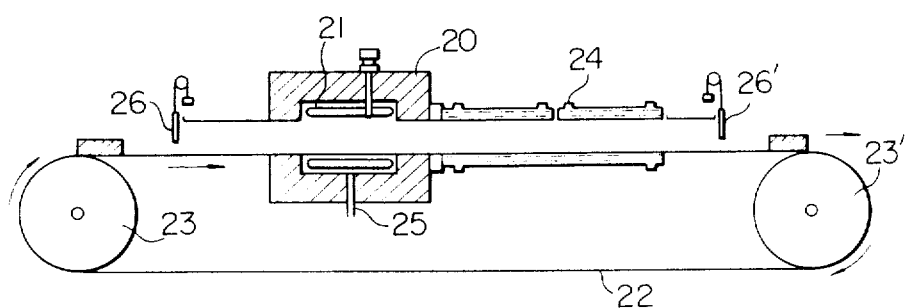
FIG. 5 is a schematic view showing the construction arrangement of preferred example of the electric furnace used to carry out the method according to this invention.

The construction of the heating system used in this experiment was such that is shown in FIG. 5. The system comprises a furnace 20 provided with a heating element 21, a meshed endless belt conveyor 22 passed on pulleys 23 and 23' through the interior of the furnace 20, and a water cooling tube 24 for cooling the heated assembly as it was being removed out of the furnace room. Designated at 25 is an inlet of reducing gas and at 26 and 26' are movable partition walls.

It will now be appreciated from the foregoing description that, since the method carrying out the invention can be put into practice without use of jigs, the performance efficiency and production economy in welding the vanes to the impeller and turbine can be significantly increased. The core and shell structures of the impeller and turbine being free from local deformation, moreover, the construction accuracy of the final product is assured satisfactorily. Since, in addition, the inner and outer flanges of the vanes are directed in the same direction, no vanes are directed in the same direction, no skillful techniques are required of the operator. It may also be mentioned that the heat-generating gas and the flux used for welding operation need not be special ones, which will also lead to improved production economy of manufacturing torque converters.

What is claimed is:

1. A method of forming a rotor structure of a torque converter comprising the steps of pressing respectively from a single sheet of a slightly flexible material a vane having a blade web warped peripherally of the rotor structure inner and outer flanges extending in the same direction respectively from inner and outer ends of said blade web; snapping a plurality of the vanes into a space between the core and shell structures to provide an assembly of the vanes, core structure and shell structure; interposing brazing materials in the form of differently sized rings between said inner flanges and said core structure and between said outer flanges and shell structure, and heating said assembly in a suitable atmosphere up to a predetermined temperature higher than the melting point of said brazing materials and lower than the melting point of said assembly.

2. A method according to claim 1, further comprising the step of cooling down said assembly after said heating step.

* * * * *